United States Patent

Legrand et al.

[11] Patent Number: 6,045,911
[45] Date of Patent: Apr. 4, 2000

[54] CUTTING FILAMENT

[75] Inventors: Emmanuel Legrand, Villeneuve, France; Göran Landén, Huskvarna, Sweden

[73] Assignee: Husqvarna AB, Huskvarna, Sweden

[21] Appl. No.: 09/077,177

[22] PCT Filed: Nov. 29, 1996

[86] PCT No.: PCT/SE96/01580

§ 371 Date: Feb. 25, 1999

§ 102(e) Date: Feb. 25, 1999

[87] PCT Pub. No.: WO97/19584

PCT Pub. Date: Jun. 5, 1997

[30] Foreign Application Priority Data

Apr. 3, 1996 [SE] Sweden ................................. 9601287

[51] Int. Cl.[7] .............................. D02G 3/00; B26B 7/00; B26B 9/00; B26B 9/02
[52] U.S. Cl. ........................... 428/399; 428/400; 30/276; 30/353; 30/355; 30/356
[58] Field of Search ..................................... 428/400, 399, 428/369, 362, 364; 30/353, 355, 356, 276

[56] References Cited

U.S. PATENT DOCUMENTS

| | | | |
|---|---|---|---|
| 3,567,569 | 3/1971 | Ono et al. | 428/399 |
| 4,054,993 | 10/1977 | Kamp et al. . | |
| 4,186,239 | 1/1980 | Mitz et al. . | |
| 4,229,501 | 10/1980 | Kern | 428/399 |
| 4,349,198 | 9/1982 | Stelek | 428/399 |
| 4,585,487 | 4/1986 | Destree et al. | 428/369 |
| 5,187,845 | 2/1993 | Duffy et al. | 428/399 |
| 5,220,774 | 6/1993 | Harbeke et al. . | |

*Primary Examiner*—N. Edwards
*Attorney, Agent, or Firm*—Pearne, Gordon, McCoy & Granger LLP

[57] ABSTRACT

The present invention relates to a cutting filament intended for trimming and cutting vegetation, such a cutting filament being used on rotary-head motorized cultivators such as brush cutters and edge trimmers. During use such cutting filaments generate a substantial and unpleasant amount of high-frequent noise which is added to the noise of the motor for driving the rotary head. These noises lead to outdoor noise pollution. Legislatory requirements aiming to limit the noise to a level deemed to be acceptable are being drawn up and could shortly come into force. The cutting filament according to the present invention is characterized in that the cutting filament (1; 10') has undulations (2; 6; 12') that recur in the longitudinal direction of the cutting filament (1; 10').

2 Claims, 6 Drawing Sheets

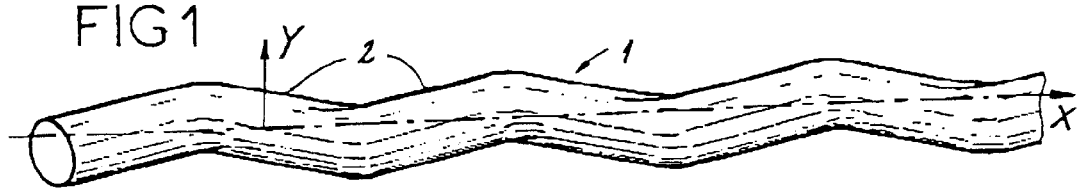
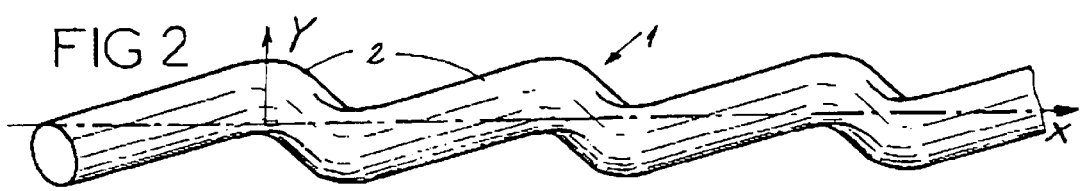
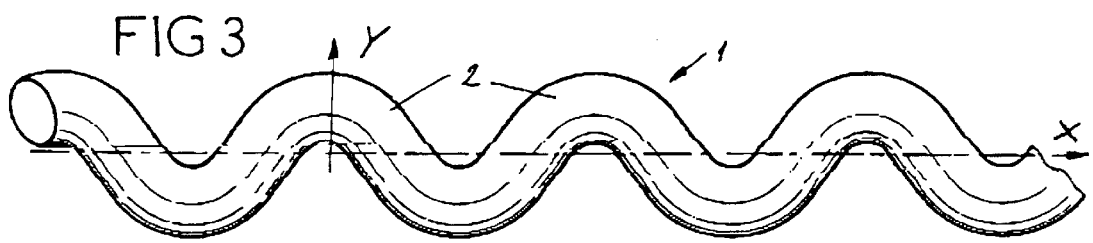
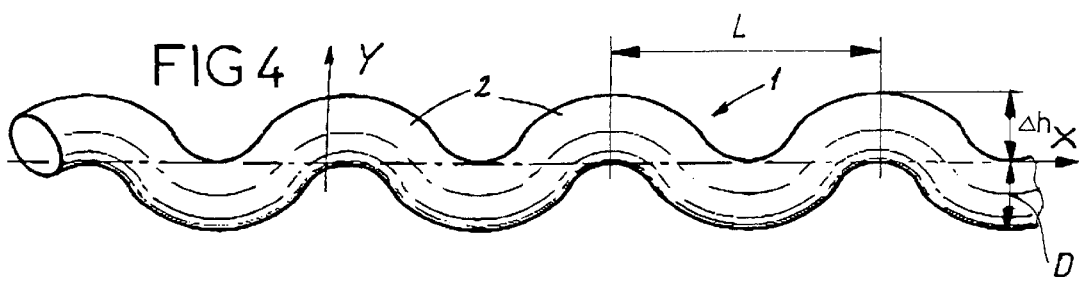
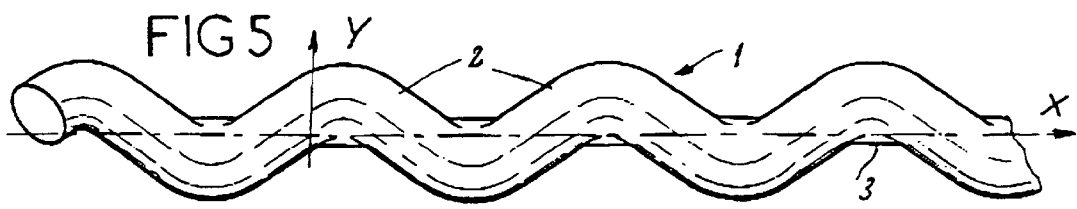
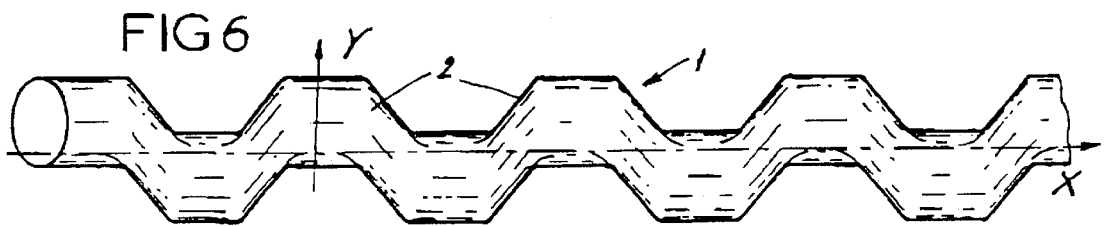

CUTTING FILAMENT

The present invention relates to a cutting filament intended for trimming and cutting vegetation, such a cutting filament being used on rotary-head motorized cultivators commonly called brush cutters and edge trimmers.

These implements are generally equipped with an electric motor or an engine, which drives in high-speed rotation, a revolving head supporting one or more cutting filaments. As the head rotates, and under the effect of centrifugal force, the cutting filament or filaments run out radially and thus cover a certain circular region, in which they slice through the vegetation they meet. In a known fashion, the cutting filaments may be plant-based, synthetic, metal, or metalloplastic filaments of the mono-filament or multi-filament type, and these filaments may have either a round section or a polygonal section, for example square or in the shape of a star.

During use, such cutting filaments generate a substantial and unpleasant amount of high-frequent noise which is added to the noise of the motor for driving the rotary head. These noises lead to noise pollution which is all the more annoying since their very nature means that brush cutters and edge trimmers are being used out of doors. In addition legislative requirements aiming to limit the noise of these implements to a level deemed to be acceptable are being drawn up and could shortly come into force.

In order to attempt to reduce the noise generated by cutting filaments during use, various solutions have already been put forward.

From U.S. Pat. No. 5,220,774 known cutting filaments having straight or helical longitudinal grooves of rounded or angular section, in varying numbers (one or more longitudinal grooves); the drawback of theses grooves is that they adversely alter the surface quality of the filament, which is an important factor in the quality of its cutting.

Another known solution, applicable especially to a cutting filament of square section, consists in twisting the filament. This solution is relatively effective, but the reduction in noise is still a function of the number of twists in cutting filament per unit length of said filament. What is more, the torsion in the filament adversely alters its surface quality; it also makes this filament more complicated and more expensive to manufacture.

Cutting filaments with a special profile in the shape of a teardrop or aerofoil have also been proposed, these profiles being supposed to improve penetration through the air. This solution allows only a quite small reduction in noise, and is therefore not particularly efficient.

Finally, mention may be made of attempts to produce cutting filaments which have small dimples at their surface, like a golf ball. Aside from the manufacturing difficulties, this last solution leads to an adverse alteration to the surface quality of the filament.

The present invention aims to avoid these drawbacks by providing an improved cutting filament which affords a substantial reduction in operating noise without adversely altering the essential properties of the filament, even improving its cutting ability which is associated with its surface quality, as well as its resistance to breaking at the eyelet, and to achieve all this with the filament still being simple and economical to produce.

To this end, the subject of the invention is a cutting filament for brush cutters and edge trimmer, characterized essentially in that it has undulations which recur in the longitudinal direction of this cutting filament and run in at least one radial direction relative to the longitudinal axis of the said cutting filament.

Thus, the solution put forward by the present invention consists, in general, in giving the cutting filament an undulated appearance. The undulations very significantly improve the coefficient of penetration of the cutting filament through the air. It is this improvement in the coefficient or penetration through air, and therefore the reduction in the impact that the filament has on the air, which generates the drop in noise, said drop may be in the order of 10 to 12 decibels. By way of general explanation of the improvement provided by the solution put forward, it may be pointed out that the undulations create numerous regions allowing the air encountered by the filament as it rotates to be discharged outwards.

The solution put forward by the present invention affords numerous and appreciable advantages.

The improvement in the penetration of the cutting filament through the air allows, aside from the substantial reduction in noise, a reduction in the motive power required to drive this filament, and hence, less strain on the electric motor or engine or the implement in question, which results in less energy expenditure (for a given rotational speed). Another result of this is that, for a given motive power, the rotational speed of the cutting filament can be increased by approximately 10 to 15%, which increases the inertia of the filament and improves the cut made by this filament.

What is more, the principle of undulating the cutting filament can be applied, with no particular difficulty, to filament of any section: round, oval, triangular, square, hexagonal, star-shaped, etc., and of any diameter or any thickness.

Finally, this undulated appearance of the cutting filament considerably improves its cutting ability and also its resistance to breakage at the eyelet where the filament emerges from the rotating head of the brush cutter or of the edge trimmer, as a result of the "work hardening" effect achieved by passing this filament between pinions or rollers (see later) designated to undulate it.

The result of this is, as a whole, and in all respects, a very marked improvement in the behaviour of the cutting filament in use.

Moreover, from the point of view of the manufacture of this cutting filament, the undulations may be obtained simply and economically, for example by passing the filament between two toothed wheels, pinions or rollers rotating in opposite directions, and this can be done either at the end of the filament-manufacturing line or subsequently (undulations produced as a separate operation).

In particular, these may be simple undulations, keeping the initial section of the cutting filament along its entire length, or undulations which are accompanied locally by a marking or the cutting filament, by crushing. The undulations themselves may be more or less rounded or angular and more or less pronounced with regular or irregular shapes. Angular undulations, creating more or less pointed teeth or ridges, actually improve the cutting ability of the filement.

According to a simple embodiment of the invention, the undulations of the cutting filament run in a single radial direction relative to the longitudinal axis of the said cutting filament. In other words, the undulated filament develops in a single plane and, for example, has the appearance of a sinusoid.

According to a further improved embodiment, the undulations of the cutting filament run in multiple radial directions relative to the longitudinal axis of the said cutting filament. In particular, these undulations may run in two radial directions forming an angle of 90° to one another. In this way, the undulations develop in two perpendicular planes. As will readily be understood, the presence of such undulations makes it possible to obtain the sought-after effect of reducing the operating noise, irrespective of the instantaneous orientation in space of the cutting filament.

The mid-planes of the undulations may be perpendicular to the longitudinal axis of the cutting filament, or oblique to this longitudinal axis, with unrestricted angle of inclination. Undulations thus inclined may be obtained, in a simple way, by making the filament pass between two helical pinions, rollers or dies. In particular, if they are inclined outwards (with respect to the position of the cutting filament and to its direction of rotation during operation), these undulations actually favour the expulsion of air and thus contribute, as a result of their orientation, to noise reduction.

In any case, the invention will be better understood with the aid of the description which follows, with reference to the attached diagrammatic drawing which represents, by way of examples, a few embodiments of this cutting filament for brush cutters and edge trimmers.

FIG. 1 is a side, slightly perspective, view of a length of cutting filament in accordance with the present invention, of round section, undulated in a plane (X,Y);

FIGS. 2–6 show alternative forms of the cutting filament of FIG. 1, all of initial round section;

Figure 31:
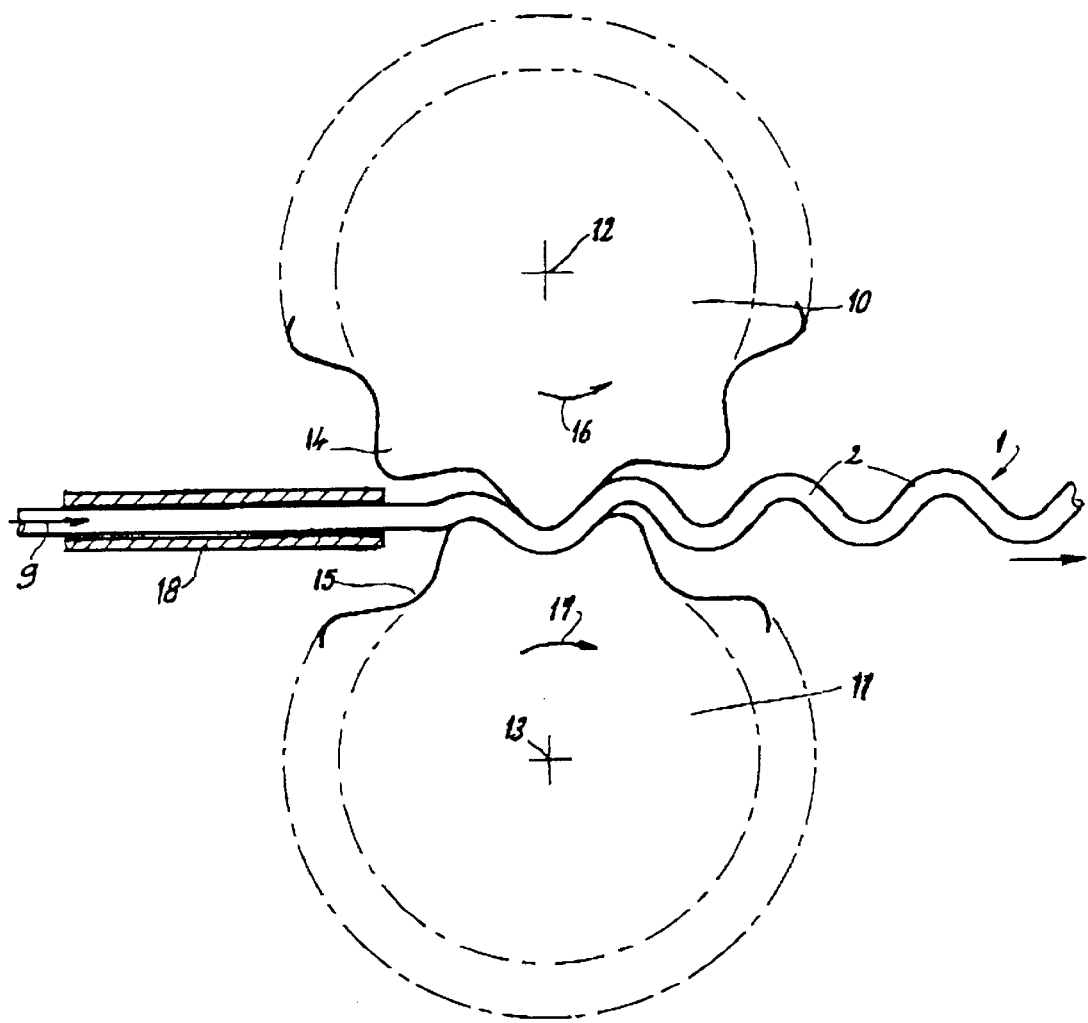

FIG. 31 very diagrammatically represents a device making it possible to obtain an undulated cutting filament in accordance with the invention.

Figure 32:
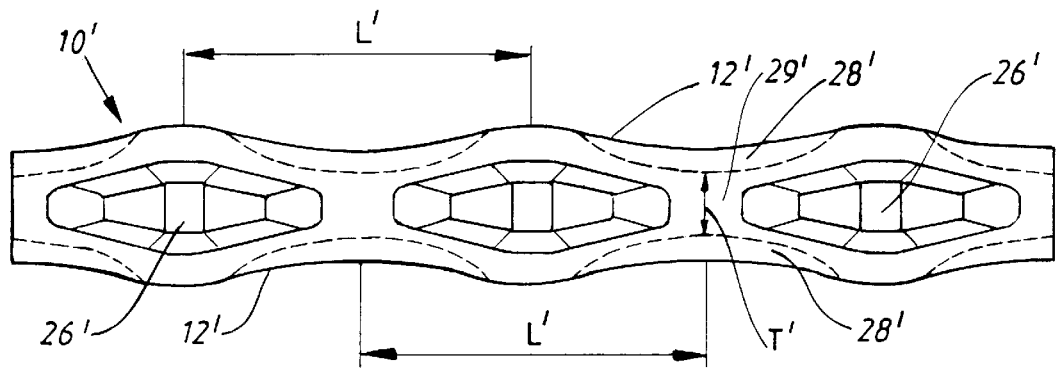
Figure 33:
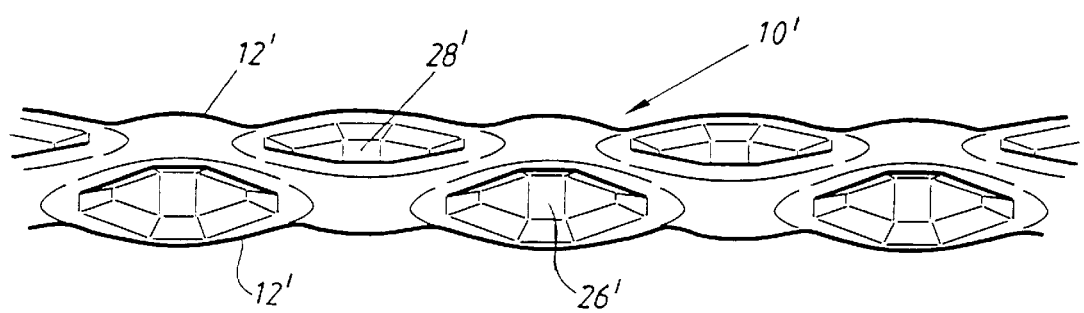
Figure 34:
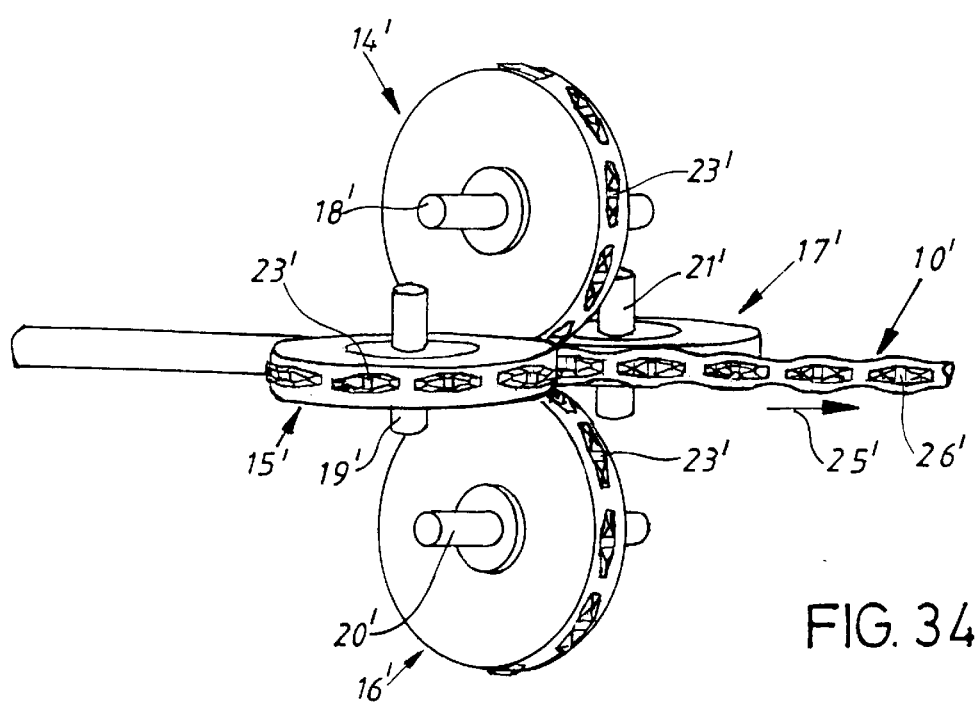

FIG. 32 shows a side view of a further embodiment of a cutting filament according to the present invention;

FIG. 33 shows a perspective view of a slightly modified embodiment of the cutting filament according to FIG. 32; and FIG. 34 shows schematically a device for manufacturing the cutting filament according to FIGS. 32 and 33.

FIG. 1 shows a length of cutting filament 1 of round section for brush cutters or edge trimmers. The cutting filament 1 has undulations 2 which recur ad infinitum in the longitudinal direction of this cutting filament 1, indicated by its mean longitudinal axis X. Here the undulations 2 are simple and not very accentuated; they are the result of alternately "ascending" and "descending" portions connected by bends. These undulations 2 run in a single radial direction Y perpendicular to the longitudinal axis X of the cutting filament 1. Thus, in the first example considered here, the undulations 2 run in a single plane and form a sort of broken or sawtooth filament. The noise generated by the cutting filament 1 during use is substantially reduced as a result of such undulations.

FIG. 2 shows a cutting filament 1 similar to the previous one, but having more pronounced undulations 2.

FIG. 3 shows another cutting filament 1 of round section, of which the undulations 2 are also very pronounced but more rounded than the previous ones, which gives the cutting filament 1 a sinusoidal appearance.

FIG. 4 shows a cutting filament 1 similar to the previous one, but having less accentuated sinusoidal undulations 2.

In FIG. 4 the filament diameter is designated D, the wave height is designated Δ h and the wave length is designated L. The following relation should be present between the diameter D and the wave length L: $3D \leq L \leq 10D$. Between the diameter D and the wave height Δ h the following relation should be valid: $0.5D \leq \Delta h \leq 2D$.

FIG. 5 shows a cutting filament 1 which has undulations 2 of a round overall shape. However, marks 3 are produced here, these forming flats in the troughs of the undulations 2.

FIG. 6 shows another cutting filament 1, in which the undulations 2 have more angular shapes.

In all the foregoing examples, the cutting filament 1 has a round and constant initial section, and its undulations 2 run in a single axial direction Y, the filament 1 thus developing in a single plane X, Y.

Figure 7:
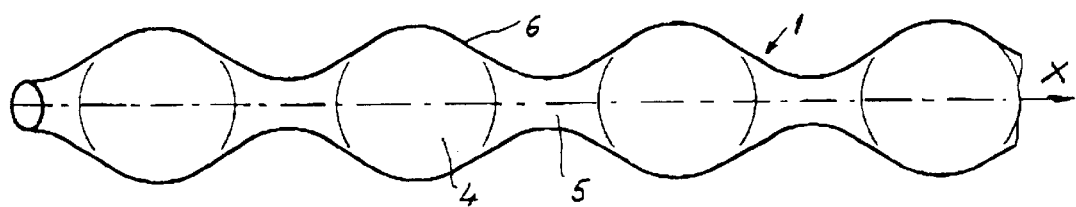
FIG. 7 represents another embodiment of the cutting filament according to the invention, of variable section.

FIG. 7 shows a cutting filament 1 of round, but non-constant section, the filament 1 having substantially spherical large-diameter portions 4 which alternate with narrower portions 5. The cutting filament 1 thus has an undulated longitudinal profile 6 in every radial direction.

Figure 8:
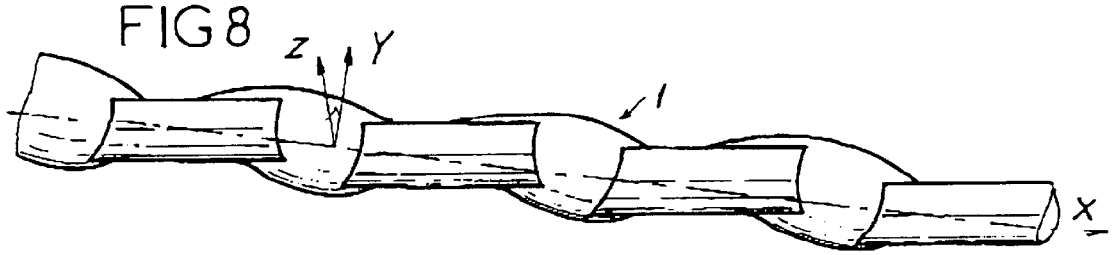
FIGS. 8 and 9 show a cutting filament according to the invention, of which the undulations run in two perpendicular radial directions.
Figure 9:
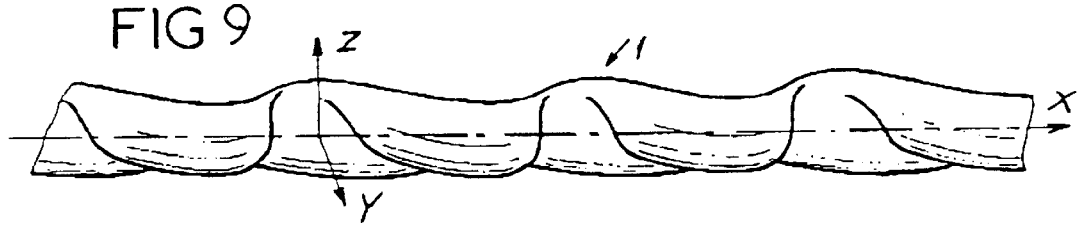

FIGS. 8 and 9 show a cutting filament 1 of initially round section which has undulations in a first radial direction Y and also in a second radial direction Z perpendicular to the previous direction.

Figure 10:
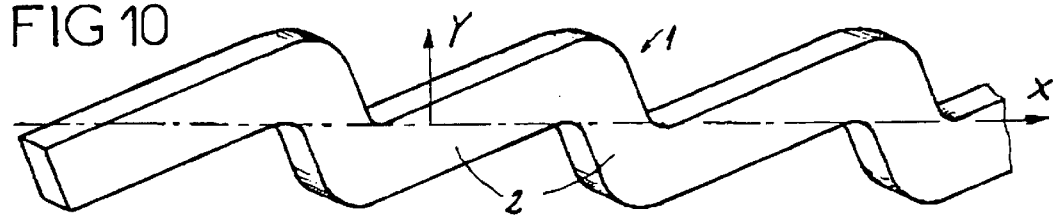
FIGS. 10 and 11 show undulated cutting filaments in accordance with the present invention, of square or rectangular section.

FIG. 10 shows a cutting filament 1 of square or rectangular section which has undulations 2 lying in a single plane, and having the same appearance as the ones described with reference to the first Figures.

Figure 11:
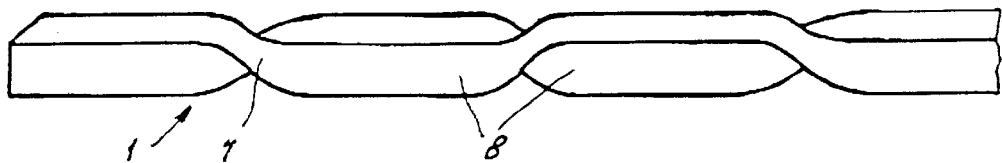
Figure 12:
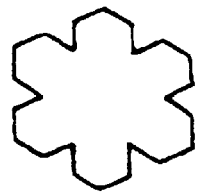
FIGS. 12 to 30 show other sections of cutting filaments which may have undulations according to the invention.
Figure 13:
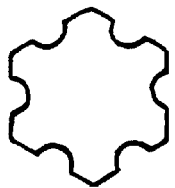
Figure 14:
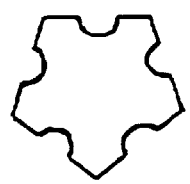
Figure 15:
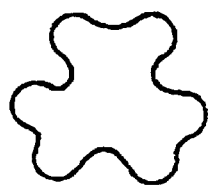
Figure 16:
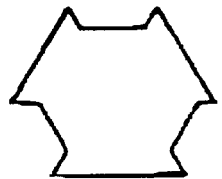
Figure 17:
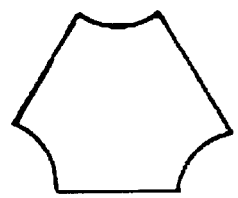
Figure 18:
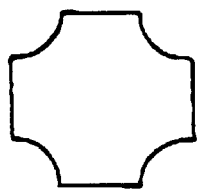
Figure 19:
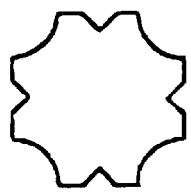
Figure 20:
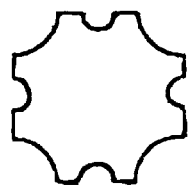
Figure 21:
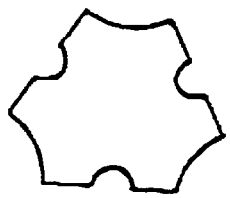
Figure 22:
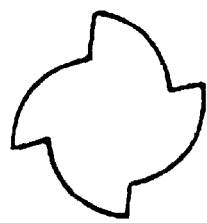
Figure 23:
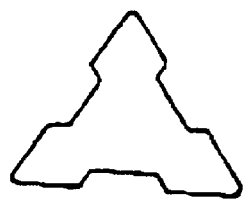
Figure 24:
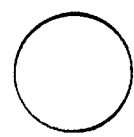
Figure 25:
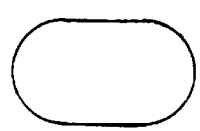
Figure 26:
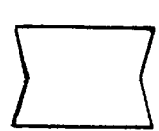
Figure 27:
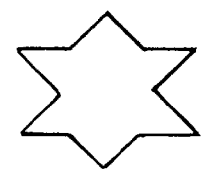
Figure 28:
Figure 29:
Figure 30:
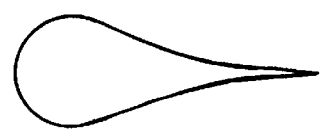

FIG. 11 shows another cutting filament 1 of square section, the undulated longitudinal profile of which results from twisted regions 7 alternating with straight lengths 8.

For the clarity of the drawing, the foregoing examples deal with undulated cutting filaments 1 of simple, that is to say round, square or rectangular, section.

The same principle of undulations can nevertheless be applied to cutting filaments of various sections, possibly more complicated ones, with a polygonal and/or curved contour; FIGS. 12 to 30 illustrate various examples of sections of cutting filaments which may be undulated and, as appropriate, marked.

The undulations 2 of the cutting filament 1 can be obtained by means of a device like the one represented in FIG. 31: the initially straight filament, advancing in the direction of an arrow 9, passes between two oppposed pionions 10 and 11 which are mounted so that they can rotate about respective axes 12 and 13. By passing between the respective toothing 14 and 15 of the two pinions 10 and 11 which rotate in opposite directions as indicated by the arrows 16 and 17, the filament 1 adopts an undulated configuration, and its undulations 2 are conserved insofar as the deformation is of the plastic (rather than elastic) type. A tubular guide 18 through which the still straight portion of the filament 1 passes, directs this filament between the two pinions 10 and 11. This device may be placed at the end of the manufacturing line for the filament 1.

The surface of the pinions 10 and 11 that contacts the cutting filament 1 is preferably adapted to the shape of the cutting filament 1. If e.g. the cutting filament 1 has a circular cross-section, said surface of the pinions 10 and 11 should be concave in axial direction of the pinions 10 and 11.

By making the filament 1 pass between two helical pinions 10 and 11, undulations 2 are obtained in which the mid-planes have an oblique orientation relative to the longitudinal axis X of the filament 1. As will be shown later, such undulations make it possible to obtain an even further improved result, as far as the reduction in operating noise is concerned.

The undulated cutting filament 1 can be made of a synthetic substance, especially polyamide, of a plantbased substance such as hemp, of metal, or of metalloplastic complex. This may be a filament of the mono-filament or multi-filament type.

In any case, the cutting filament 1 has an undulated appearance, that is to say a longitudinal profile with an alternation of more or less pronounced crests and troughs situated in a single plane or orientated in different planes and able to give this cutting filament 1 the appearance of a simple undulation, of a small chain, of a braid, etc. capable of reducing the noise generated by the cutting filament during use.

Trials undertaken have made it possible to confirm the substantial reduction in noise level which is obtained by virtue of the undulations of the cutting filement, as previously described.

These trials were undertaken at a location where the background noise level was 50.5 decibels, using laboratory equipment comprising a rotating head (capable of taking various filaments), driven in rotation by an electric motor at a nominal speed of 5000 revolutions/minute. The noise level measured with the motor rotating at this speed under no load, that is to say the head not carrying any filament, was 79.1 decibels.

A first series of trials consisted in rotating the head carrying a conventional cutting filament of round section with a diameter equal to 2.4 mm, without undulations. The mean of the noise intensities measured (used as a reference for the subsequent trials) was 101.47 decibels.

A second series of trials was undertaken with a filament of the same round section, having undulations of which the mid-plane was perpendicular to the longitudunal axis of the filament. As the plane of the trajectory of the filemant is horizontal, the undulations of the filament were arranged lying flat and standing vertically, in turn.

With the undulations lying flat, the mean of the noise intensities measured rose to 89.48 decibels, namely a reduction of 11.99 decibels.

With the undulations standing vertically, the mean of the noise intensities measured rose to 92.79 decibels, namely a reduction of 8.68 decibels.

Since the orientation in space of the filament is in actual fact random, the mean of the previous two values, namely a mean redcution of 10.33 decibels, may be taken to be meaningful.

A third series of trials was undertaken with a filament of the same round section having undulations of which the mid-plane was inclined to the longitudinal axis of the filament, the inclination being outwards. As before, the undulations of the filament were arranged lying flat and standing vertically, in turn.

With the undulations lying flat, the mean of the noise intensities measured rose to 88.58 decibels, namely a reduction of 12.89 decibels.

With the undulations standing vertically, the mean of the noise intensities measured rose to 93.24 decibels, namely a reduction of 8.23 decibels.

The mean reduction (mean of the previous two values) therefore went up to 10.56 decibels.

By way of comparison, a final series of trials was carried out with a filament of the same round section, still having undulations of which the mid-plane was inclined to the longitudinal axis of the filament, but of which the inclinations pointed inwards, in contrast to the previous series.

With the undulations lying flat, the mean of the noise intensities measured rose to 91.64 decibels, namely a reduction of 9.83 decibels.

With the undulations standing vertically, the mean of the noise intensities rose to 99.31 decibels, namely a reduction of 8.16 decibels.

The mean reduction (mean of the previous two values) therefore went up to 9.00 decibels.

These trials confirm the appreciable reduction in noise level obtained by the undulations in the filament, and the even greater reduction obtained in the case of oblique undulations, provided that these undulations point outwards.

The cutting filament 10' disclosed in FIG. 32 has also undulated contours 12' in the plane of the paper. The undulated contours 12' have been achieved by a pair of diametrically applied first indentations 26' in the cutting filament 10', one of said first indentations being hidden since it is located at the rear side of the cutting filament 10' in FIG. 32. Said pair of first indentations 26' are thus located in a plane perpendicular to the paper in FIG. 32 and they are arranged at a certain center to center distance L' that corresponds to the wave length of the embodiment according to FIG. 32.

As indicated by dotted lines in FIG. 32 a pair of second indentations 28' are applied in the plane of the paper in FIG. 32, said second indentations 28' being located between the first indentations 26', i.e. the indentations 26' and 28' are applied in two planes perpendicular to each other. Also the indentations 28' are arranged at a center to center distance from each other that is the same as the center to center distance between the indentations 26'. Said pairs of first and second indentations 26' and 28' respectively overlap each other in the longitudinal direction of the cutting filament 10'. Thereby it is guaranteed that along its entire length the cross-section of the cutting filament is changed from the original, i.e. the cross-section before the indentations are applied. The change of the cross-section from the original is favourable for decreasing the noise generation as the cutting filament 10' rotates.

In the embodiment according to FIG. 32 the indentations 26', 28' are prismatic. Within the scope of the invention other types of indentations are possible, e.g. conical or hemispherical.

In the embodiment according to FIG. 32 indentations 26', 28' are applied in two planes perpendicular to each other. Such a design is most suitable for certain cross-sections, e.g. circular, square or rectangular. Within the scope of the invention it is also possible that pairs of indentations are applied only in one plane. Such an embodiment seems to be most suitable for a drip shaped cross-section. Thus, the cross-sectional shape of a cutting filament that is provided with pairs of diametrical indentations may vary in several ways.

The perspective view disclosed in FIG. 33 of a slightly modified embodiment of the cutting filament 10' illustrates in a more obvious way the appearance that is given to the cutting filament 10' by the indentations 26' and 28' applied in two planes perpendicular to each other. The modification is that the overlap between the indentations 26' and 28', in the longitudinal direction of the cutting filament 10', is larger in FIG. 32 than in FIG. 33.

The device shown in FIG. 34 includes four embossing wheels 14', 16' and 15', 17' respectively. The wheels 14' and 16' cooperate and the wheels 15' and 17' cooperate. The embossing wheels 14–17' are mounted on adherent shafts 18', 19', 20' and 21'. At the periphery of the embossing wheels 14'–17' embossing projections 23' are provided. The opposite, cooperating embossing wheels 14', 16' and 15', 17' respectively are synchronized in such a way that when rotating the embossing projections 23' are located directly opposite to each other in the area where the indentations 26' and 28' of the cutting filament 10' takes place, i.e. the area where the cooperating embossing projections 23' are closest to each other. Further the pairs of embossing wheels 14', 16' and 15', 17' are so synchronized that they alternately effect pairs of indentations in the cutting filament 10'. One pair of embossing wheels 15' and 17' in FIG. 34 is located in front of the other pair of embossing wheels 14' and 16' in FIG. 34, seen in the feeding direction of the cutting filament 10', said direction being indicated by the arrow 25' in FIG. 34. By such an arrangement the cutting filament 10' is allowed to expand freely in a direction perpendicular to the direction of indentation when a pair of the embossing wheels 14', 16' or 15', 17' work the cutting filament 10', i.e. when the indentations 26' are made in the cutting filament it is allowed to epxand to create an undulation in a plane perpendicular to the direction of indentation.

Although not shown in the schematic FIG. 34, the embossing wheels 14'–17' are provided with concave portions in the circumferential direction, said concave portions being located between the embossing projections 23'. Thereby it is guaranteed that the undulation created by the indentations 26', 28' is not reduced by the portions between the embossing projections 23' of the embossing wheels 14'–17' when the cutting filament 10' passes between said embossing wheels 14'–17'.

In the embodiments shown in FIGS. 32 and 33 the embossing projections 23' are so closely arranged on every embossing wheel 14'–17' that the indentations 26' and 28', located in the planes perpendicular to each other, overlap each other, said overlap being larger in FIG. 32 than in FIG. 33.

From studying the indentations 28' in FIG. 32 it can be learnt that said indentations do not meet each other but an essentially non-affected material portion 29' remains between the opposite indentations 28'. The cross dimension T', in the plane of the paper in FIG. 32, of said material portion 29' may of course vary. It is realised that when the cross dimension T' decreases the undulation increases in a plane perpendicular to the paper in FIG. 32 and when the cross dimension T' increases the undulation decreases in said plane.

When manufacturing a cutting filament 10' according to FIGS. 32 and 33 a heated filament blank is fed between the cooperating embossing wheels 14', 16' and 15', 17' respectively and indentations 26' and 28' are created in the cutting filament 10'.

As pointed out above in connection with FIGS. 32–34 it is favourable if the cross-section of the cutting filament is changed from the original along its entire length. When the indentations 26', 28' are applied preferably no material should be displaced in the longitudinal direction of the cutting filament, i.e. the displacement of material should take place by expansion transverse to the longitudinal direction of the cutting filament. If no displacement of material in the longitudinal direction of the cutting filament takes place then the cross-sectional area of the cutting filament will remain substantially constant.

By using a prismatic projection 23' the expansion transverse to the longitudinal direction of the cutting filament is emphasized.

As an alternative to the manufacturing process described above and shown in FIG. 34 the cutting filament according to the present invention may be manufactured by injection moulding. In such a case cutting filaments of a certain length are manufactured, the length being preferably 30–40 cm. Such cutting filaments are especially suitable for rotary-head motorized cultivators that are for hire.

As goes without saying, the invention is not limited merely to the embodiments of the cutting filament for brush cutters and edge trimmers which have been described hereinabove by way of examples; on the contrary, it encompasses all alternative forms of embodiment and of application thereof which use the same principle. In particular, it would not be departing from the scope of the invention if the detail of the shapes of the undulations in the filament were modified, or if other methods were used to obtain these undulations, or alternatively if such an undulated cutting filament or similar cutting tool were specified for any other suitable motorized cultivator.

We claim:

1. Cutting filament for trimming and cutting vegetation, adapted for use in rotary-head power-driven equipment such as brush cutters and grass trimmers and having a noise reducing undulations (2; 6; 12') recurring in the longitudinal direction of the cutting filament (1; 10') and running in at least one radial direction (Y, Z) relative to the longitudinal axis (X) of the cutting filament, characterized in that midplanes of the undulations are oblique to the longitudinal axis (X) of the cutting filament and that the undulations are inclined outwards with respect to the position of the cutting filament and to its direction of rotation during use.

2. Cutting filament according to claim 1, characterized in that the undulations (2) run in a single radial direction (Y) relative to the longitudinal axis (X) of the cutting filament which thus develops in a single plane.

\* \* \* \* \*